8782X
J. Hawes.
Floating Dock.
Patented Apr. 22, 1835.
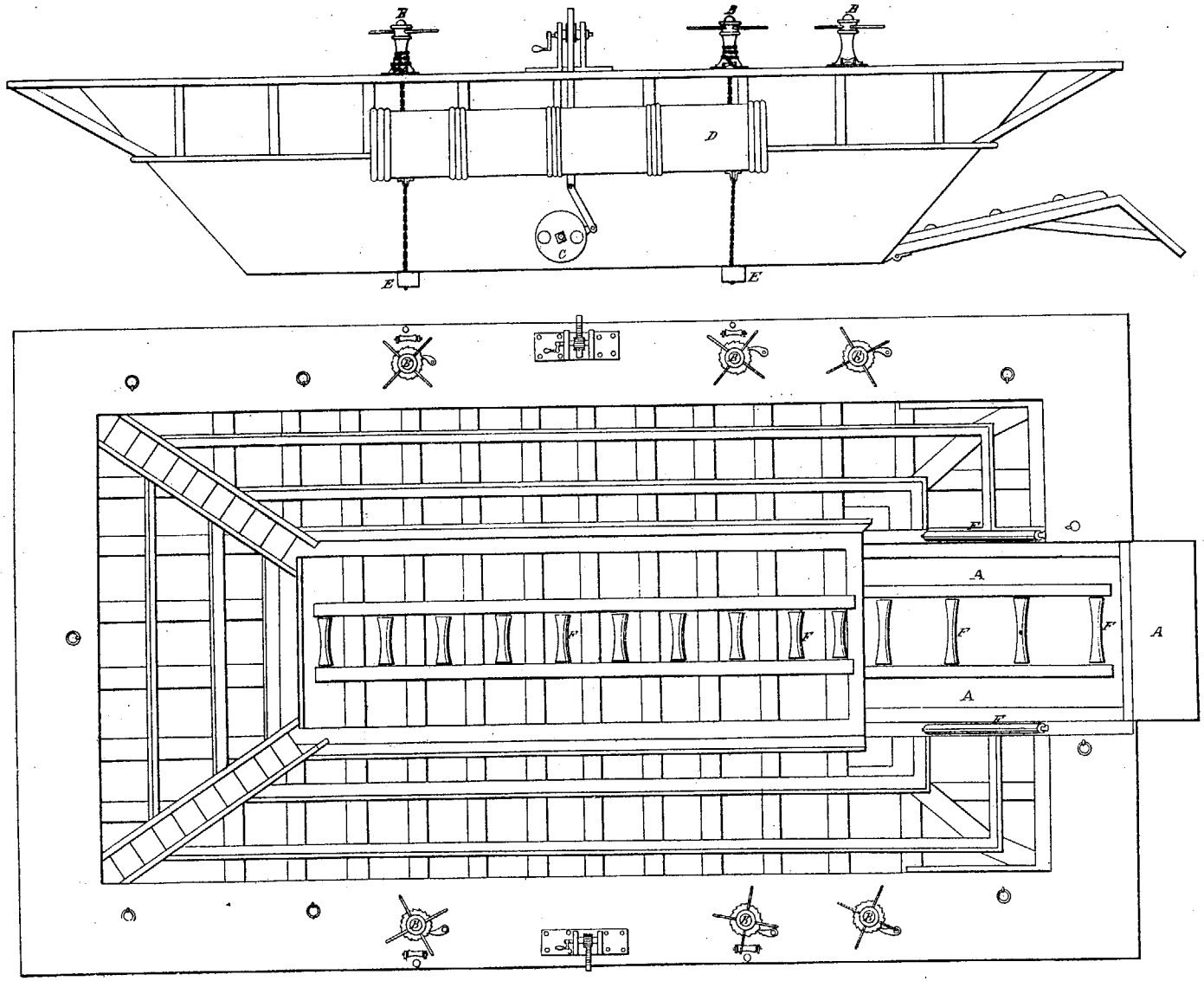
N. PETERS, PHOTO-LITHOGRAPHER, WASHINGTON, D. C.

87822X 4-22-1835

Jonathan Hawes, Auburn, State of New York

The schedule referred to in these Letters Patent and making part of the same containing a description in the words of the said Jonathan Hawes himself of his improvement in a Machine, for the purpose of hoisting all kinds of shipping and water craft, which he calls a "Floating dry dock"

---

To all to whom these presents shall come. Be it known that I, Jonathan Hawes of Auburn in the County of Cayuga, and State of New-
4) York have invented a new and useful machine for hoisting all kinds of shipping and water craft, which I call a floating dry dock and that the following is a full and exact description of the construction and operation of the said Machine as invented by me.

The floating dry dock is constructed like a scow or open Boat, with one or more gates, at one or both ends, to be hung at the bottom or sides; the gate or gates to be sufficiently large for Ships or vessels to enter, and to open outward and to be closed, after the ship or vessel has entered, by means of one or more windlasses or capstans to be placed upon the gunwales or sides; with one or more valves to be placed on the bottom or sides of the dock, sufficient in size to scuttle or sink the dry dock to a proper depth for a ship or vessel to be hauled in or out, with one or more pumps sufficient in size to pump the water off after the ship or vessel is in and the gate or gates and the valves are closed, the pumps to be worked by steam or other power; with two or more buoys on each side of the dock sufficient to keep the dock upright, the buoys to be secured by chains or ropes passing through a strong piece of timber fastened at the bottom of the dock and round a shiv to be lowered or raised by capstans or windlasses placed on the gunwales or sides of the dock, with stationary rollers on the gate or gates and fore and aft and at the centre of the dock on the bottom, the rollers are for the purpose of assisting in hauling ships or vessels in or out of the dock, and also for the ships or vessels to rest on after the water is pumped out, and also perpendicular

8782X stationary rollers on each side of the gate way to aid in hauling ships or vessels in or out of the dock, with a sufficient number of ring bolts in different parts of the dry dock to aid in hawling the ships or vessels in or out of the dock.

The size and strength of the docks and the materials of which they are constructed are in all cases to be proportioned to the size of the ships or vessels for which the docks are intended. The dock is particularly adapted to repairing all kinds of shipping.

In testimony that the above is a full and correct description of the construction and use of my machine as invented by me, I have hereunto set my hand this eighteenth day of February in the year Eighteen hundred and thirty five.

Witnesses
R. Cook
Willet Lounsbury

Jonathan Hawes (Exd. M.G.C.

(567 words)

(Patented April 22d 1835.)

Drawing Made